United States Patent
Liu

(10) Patent No.: US 9,906,056 B2
(45) Date of Patent: Feb. 27, 2018

(54) CHARGING DEVICE OF ELECTRONIC CIGARETTE AND CHARGING METHOD THEREOF

(71) Applicant: HUIZHOU KIMREE TECHNOLOGY CO., LTD. SHENZHEN BRANCH, Shenzhen, Guangdong (CN)

(72) Inventor: Qiuming Liu, Guangdong (CN)

(73) Assignee: HUIZHOU KIMREE TECHNOLOGY CO., LTD. SHENZHEN BRANCH, Shenzhen (CN)

( * ) Notice: Subject to any disclaimer, the term of this patent is extended or adjusted under 35 U.S.C. 154(b) by 0 days.

(21) Appl. No.: 15/033,118

(22) PCT Filed: Oct. 31, 2013

(86) PCT No.: PCT/CN2013/086330
§ 371 (c)(1),
(2) Date: Apr. 29, 2016

(87) PCT Pub. No.: WO2015/062028
PCT Pub. Date: May 7, 2015

(65) Prior Publication Data
US 2016/0268824 A1    Sep. 15, 2016

(51) Int. Cl.
H02J 7/00        (2006.01)
A24F 47/00       (2006.01)

(52) U.S. Cl.
CPC .......... *H02J 7/0044* (2013.01); *A24F 47/002* (2013.01); *H02J 7/0021* (2013.01);
(Continued)

(58) Field of Classification Search
CPC ...... H02J 7/0044; H02J 7/0021; H02J 7/0027; H02J 7/0045; H02J 7/0052; A24F 47/002; A24F 47/008; A24F 15/12; A24F 15/18
(Continued)

(56) References Cited

U.S. PATENT DOCUMENTS

| | | | |
|---|---|---|---|
| 2010/0313901 A1* | 12/2010 | Fernando | A24F 47/008 131/330 |
| 2012/0227753 A1 | 9/2012 | Newton | |
| 2014/0014125 A1* | 1/2014 | Fernando | A24F 47/008 131/328 |

OTHER PUBLICATIONS

International Search Report of PCT Patent Application No. PCT/CN2013/086330 dated Aug. 13, 2014.

* cited by examiner

*Primary Examiner* — Edwin A. Leon

(57) ABSTRACT

This present application relates to a charging device of an electronic cigarette and a charging method thereof. The charging device including a charging base, in which a first charging electrode assembly and a second charging electrode assembly are arranged separately for connecting with a first and a second electrode of the electronic cigarette, wherein in the charging base, a charging slot is defined in the charging base. The first charging electrode assembly, the second charging electrode assembly and the charging base are coaxially sheathed, and both the first charging electrode assembly and the second charging electrode assembly extend into the charging slot. By implementing this structure, the electronic cigarette has a simplified and compact structure and an easy assembly, also facilitates a steady electrical connection with the electronic cigarette. When charging, it is only needed to insert the electronic cigarette into the charging slot.

18 Claims, 6 Drawing Sheets

(52) U.S. Cl.
CPC .......... *H02J 7/0027* (2013.01); *H02J 7/0045* (2013.01); *H02J 7/0052* (2013.01); *A24F 47/008* (2013.01)

(58) Field of Classification Search
USPC .................................................. 131/328, 347
See application file for complete search history.

CHARGING DEVICE OF ELECTRONIC CIGARETTE AND CHARGING METHOD THEREOF

FIELD OF THE INVENTION

This invention relates to the field of electronic commodity, and more particularly to a charging device of an electronic cigarette and charging method thereof.

BACKGROUND OF THE INVENTION

When an electronic cigarette is being charged in the prior art, electrical connection between a battery component of the electronic cigarette and a charging device of the electronic cigarette is generally obtained through threaded connections, so as to further charge the electronic cigarette. With this type of structure, the electronic cigarette needs to be rotated round and round so that to realize reliable fixing with the charging device of the electronic cigarette. However, this operation is too complex, and the connection is easy to get loose for worn threads, thus causing defective electrical contact. Moreover, in the electronic cigarette shown in FIG. 1, an end cover 4 is mounted at an end of a battery 41, and charging electrodes includes a first electrode 30 and a second electrode 31 respectively connected with a positive electrode and a negative electrode of the battery 41. Wherein, the second electrode 31 axially runs through a center of the end cover 4 and is fixed, the first electrode 30 clamps the end cover 4 around the margin of the end cover 4, and the end cover 4 is made of insulated materials, thus maintaining insulation between the first electrode 30 and the second electrode 31. Obviously, the above-mentioned charging device of an electronic cigarette, which adopts threaded connections to obtain electrical connection, cannot charge the electronic cigarette shown in FIG. 1.

SUMMARY OF THE INVENTION

Aiming at the defect that the operation is complex and the charging device is possibly unsuitable for the electronic cigarette with charging electrode configured on the end cover in the prior art, the technical problem of the present invention to solve is to provide a charging device of an electronic cigarette and charging method thereof.

The technical solution of the invention is as follows:

In one aspect, the present invention discloses a charging device of an electronic cigarette, the charging device includes a charging base, a first charging electrode assembly connected to a first electrode of the electronic cigarette and a second charging electrode assembly connected to a second electrode of the electronic cigarette are arranged in the charging base; in the charging base, a charging slot is defined for inserting the electronic cigarette; and the first charging electrode assembly and the second charging electrode assembly both coaxially sheathe with the charging base and both extend into the charging slot.

In one embodiment, both the first charging electrode assembly and the second charging electrode assembly are resilient electrode assembly; during charging process, the first charging electrode assembly and second charging electrode assembly resiliently abut against the first electrode and the second electrode, and provide resilience in a direction opposite to an inserting direction of the electronic cigarette, respectively.

In a further embodiment, the first charging electrode assembly is movably connected with the charging base and sheathes the outer periphery of the charging base.

In a further embodiment, an abutment slope, sloping towards an inner surface of the charging base, is configured on an end surface of the first charging electrode assembly, and the end surface electrically connects with the electronic cigarette.

In a further embodiment, at least one resilient resisting piece used for clamping the electronic cigarette is protruded from and embedded in the inner surface of the charging base.

In a further embodiment, at least one first through hole communicating with the charging slot is defined on a lateral surface of the charging base, and the at least one resilient resisting piece is embedded into the at least one first through hole and further partially extends into the charging slot.

In a further embodiment, the first charging electrode assembly includes a first charging electrode and a first elastic piece abutting against the first charging electrode and providing resilience in the direction opposite to the inserting direction of the electronic cigarette to the first charging electrode; and the second charging electrode assembly includes a second charging electrode and a second elastic piece abutting against the second charging electrode and providing resilience in the direction opposite to the inserting direction of the electronic cigarette for the second charging electrode.

In a further embodiment, arranging holes communicating with the charging slot are also defined on a lateral surface of the charging base, and the first charging electrode partially runs through the arranging hole and protrudes from a surface of the charging slot.

In a further embodiment, the first charging electrode including an annular sleeve part which is sleeved in the charging base and gripping parts which at least partially perpendicularly extend along sides of the annular sleeve part; the gripping parts are embedded in the arranging holes and protrude from an inner surface of the charging slot; the annular sleeve part abuts against the first elastic piece; and the gripping parts and the annular sleeve part are retractable in an axial direction of the charging slot.

In a further embodiment, the first elastic piece is a spring sheathing the charging base.

In a further embodiment, a receiving cavity is defined at an end of the charging base; the receiving cavity communicates with the charging slot; the second charging electrode is retractably configured in the receiving cavity and further extends into the charging slot.

In a further embodiment, a charging control panel is arranged at an end of the receiving cavity away from the charging base, for electrically connecting to the first charging electrode assembly and the second charging electrode assembly respectively; and one end of the first elastic piece abuts against the first charging electrode, while the other end of the first elastic piece abuts against the charging control panel.

In a further embodiment, the second charging electrode is a conductive column, which runs out from a bottom of the charging slot, with an annular limiting part protruding from an outer surface of the conductive column; a second elastic piece sleeves between the annular limiting part and the charging control panel, wherein one end of the second elastic piece abuts against the annular limiting part, and the other end of the second elastic piece abuts against the charging control panel.

In a further embodiment, the second elastic piece is a spring.

In a further embodiment, the charging device of an electronic cigarette also includes a housing for fixing the charging base, an USB joint for connecting an external power source is configured on the housing, and the USB joint is electrically connected to the charging control panel.

In a further embodiment, the housing includes an upper cover and a base cover fitted to each other.

In a further embodiment, an indicator is arranged on the charging control panel, for indicating charging states, a second trough hole is defined at a position corresponding to the indicator on the housing, and a light guiding column is embedded in the second through hole.

In another aspect, the present invention further discloses a charging method of a charging device of an electronic cigarette, which includes steps as follows:

inserting step: by applying an external force, inserting the electronic cigarette into a charging slot of a charging base and the electronic cigarette resiliently abutting against a first charging electrode assembly and a second charging electrode assembly, the first charging electrode assembly, the second charging electrode assembly and the charging base are coaxially sheathed;

charging step: by releasing the external force, the electronic cigarette moving towards an opening of the charging slot under resilience of the first charging electrode assembly and the second charging electrode assembly until a friction resilient provided to the electronic cigarette by at least one resilient resisting piece, and thus forming an electrical connection.

In a one embodiment, an abutment slope, sloping towards an inner surface of the charging base, is configured on an end surface of the first charging electrode assembly, and the end surface electrically connects with the electronic cigarette.

In a further embodiment, the first charging electrode assembly includes a first charging electrode and a first elastic piece abutting against the first charging electrode and providing resilience in the direction opposite to the inserting direction of the electronic cigarette to the first charging electrode; and the second charging electrode assembly includes a second charging electrode and a second elastic piece abutting against the second charging electrode and providing resilience in the direction opposite to the inserting direction of the electronic cigarette to the second charging electrode.

By implementing the charging device of the electronic cigarette and charging method thereof of the present invention, following advantages may be obtained: it is possible to achieve a simplified and compact structure, an easy assembly, as well as to prompt production efficiency, for the charging device of the electronic cigarette is provided with a first and a second charging electrode assemblies which are both coaxially sheathe with the charging base and both extend into the charging slot. Furthermore, the electronic cigarette can be charged directly by being inserted into the charging slot, thus avoiding the defects of complex operation caused by threaded connections. The electrode assemblies in coaxially sheathing configuration and extending forward can guarantee an exact positioning effect with the charging electrode of the electronic cigarette, and achieve a better contact, thus solving the defects of poor contact of the charging device of the electronic cigarette in the prior art.

Moreover, for the resilient structure of both the first charging electrode assembly and the second charging electrode assembly, the electrodes of the electronic cigarette are always resiliently abutting against the first charging electrode assembly and the second charging electrode assembly. Meanwhile, for the abutting effect of the resilient resisting piece in the inner surface of the charging base, the charging operation is much steadier when the electronic cigarette is clamped by two resilient resisting pieces. Besides, as the abutment slope sloping towards an inner surface of the charging base and electrically connecting with the electronic cigarette, is configured in an end surface of the first charging electrode assembly, the charging device of the electronic cigarette in the present invention is suitable for charging electronic cigarettes with different diameters.

BRIEF DESCRIPTION OF THE DRAWINGS

The present application will be further described with reference to the accompanying drawings and embodiments in the following. In the accompanying drawings.

DETAILED DESCRIPTION OF THE PREFERRED EMBODIMENT

To make the technical features, objective and effects of the invention more clearly understood, the invention is to be further described with reference to the accompanying drawings and embodiments.

Figure 1:
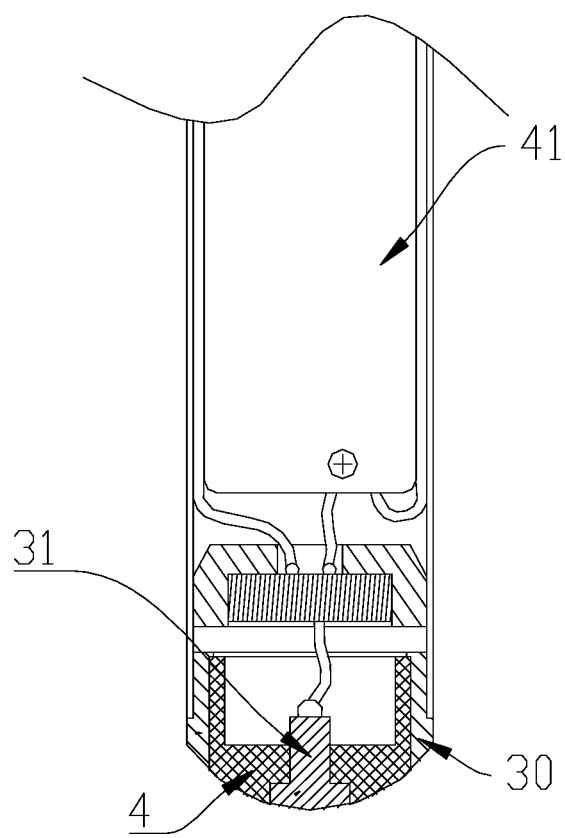
FIG. 1 illustrates a partial view of a structure of a battery pipe of an electronic cigarette in the prior art.
Figure 2:
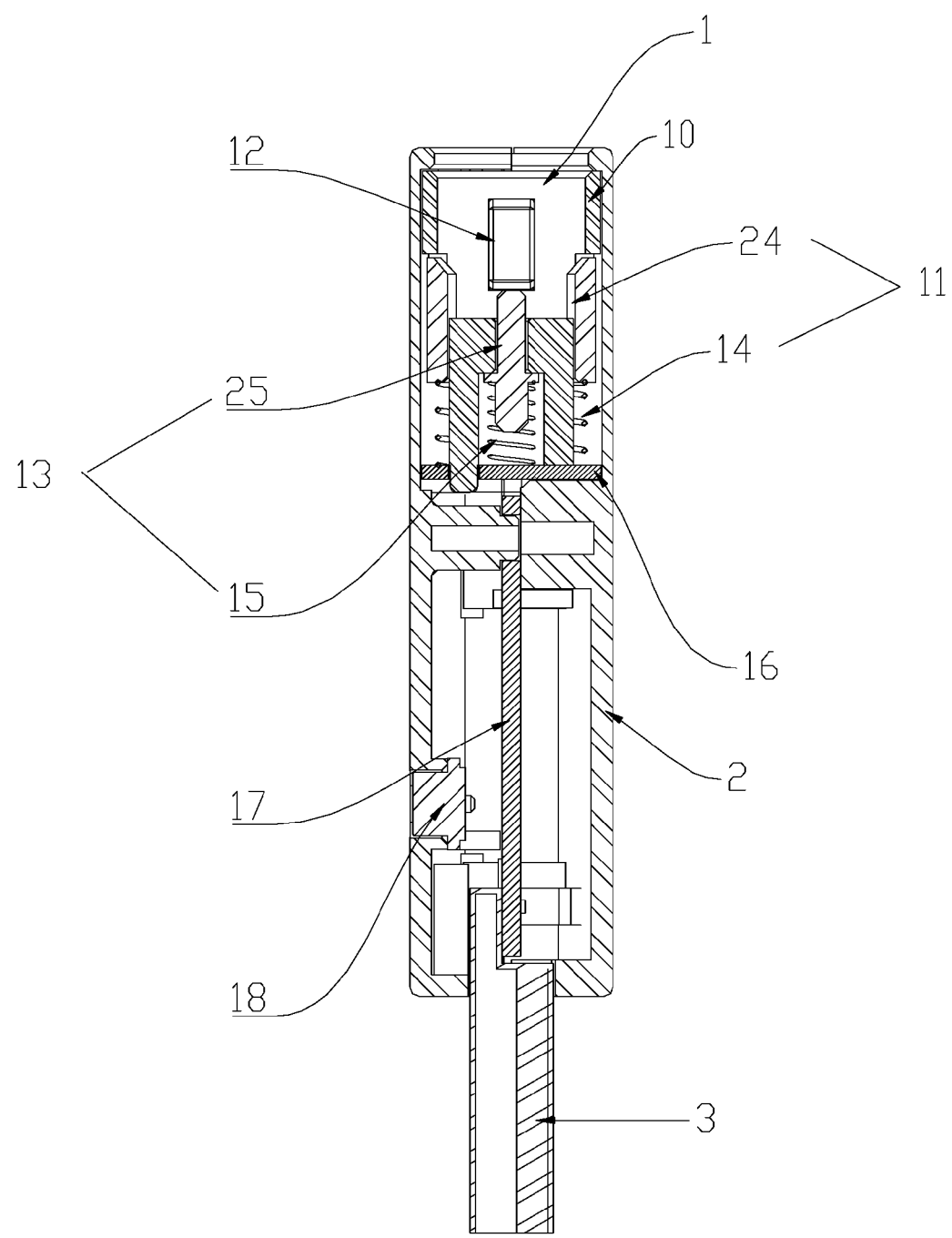
FIG. 2 illustrates a structure of a charging device of an electronic cigarette in accordance with a first embodiment of the present invention.
Figure 3:
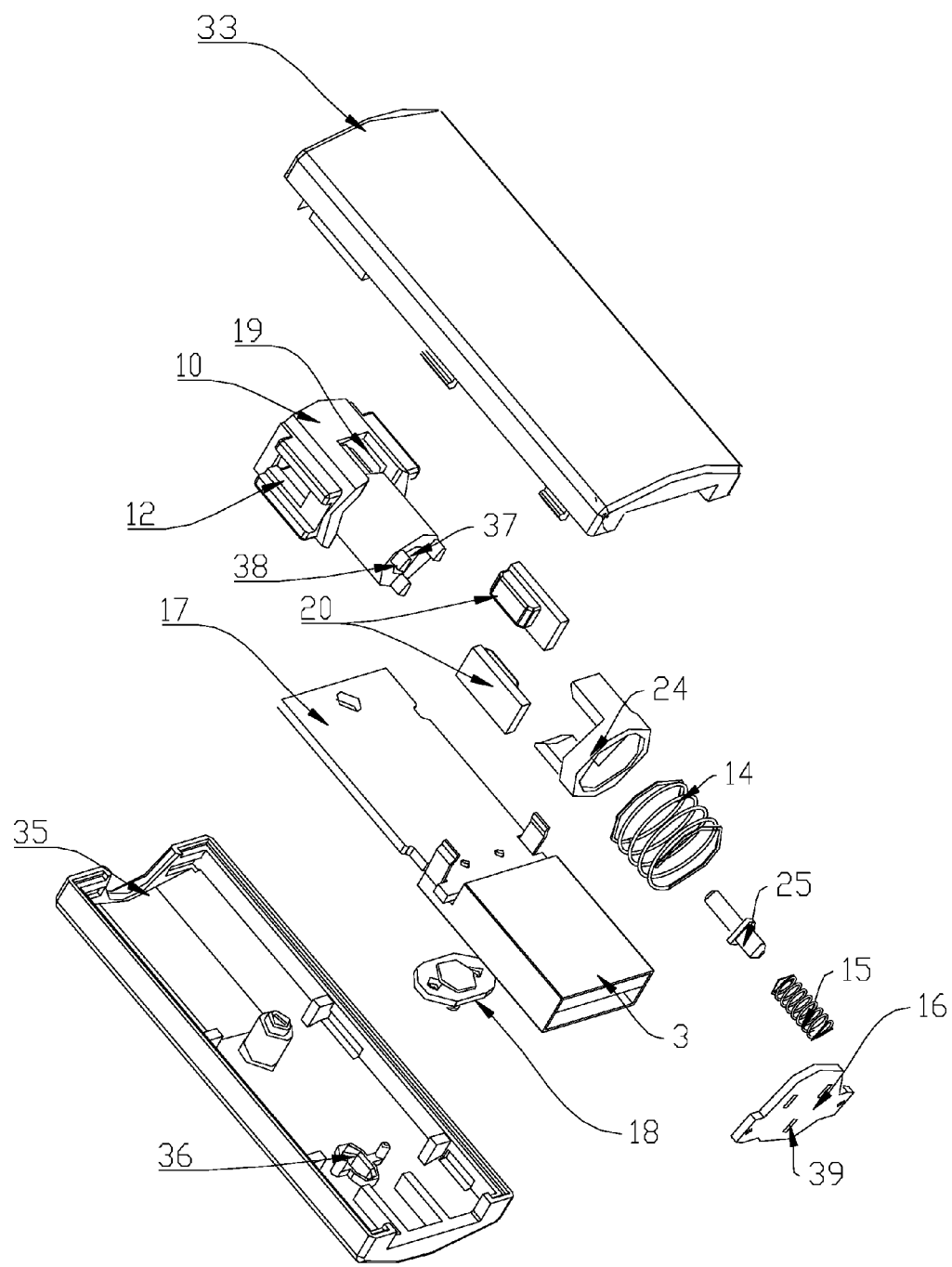
FIG. 3 illustrates an exploded view of the charging device of the electronic cigarette shown in FIG. 2.

Referring to FIGS. 2-3, in one preferable embodiment of the invention, a charging device of an electronic cigarette is provided, which can be used to charge an electronic cigarette shown in FIG. 1. The charging device includes a charging base 10 and electrode assemblies which are electrically connected to the first electrode 30 and the second electrode 31 of the electronic cigarette shown in FIG. 1, a charging slot 1 in the charging base 10 is defined for receiving the electronic cigarette. The electrode assemblies include a first charging electrode assembly 11 and a second charging electrode assembly 13 that extend into the charging slot 1. The first charging electrode assembly 11, the second charging electrode assembly 13 and the charging base 10 are coaxially sheathed, thus ensuring the electrical connection between the first charging electrode assembly 11 and the first electrode 30 of the electronic cigarette in FIG. 1 as well as the electrical connection between the second charging electrode assembly 13 and the second electrode 31 of the electronic cigarette in FIG. 1 respectively. In particular, the charging device of the electronic cigarette in this case is an USB charging device for electronic cigarettes, and therefore, an USB joint 3 used for connecting with an external power source is also arranged in the charging device of the electronic cigarette in the present invention. It is conceivable that the charging device of the electronic cigarette in the invention shall not be limited in the USB charging device, and it can also be a charging device of an electronic cigarette arranged in an electronic cigarette case. With the coaxial sheathing configuration adopted in the present invention, the electronic cigarette in the present invention therefore has a simplified and compact structure and an easy assembly, also facilitates the electrical connection with the electronic cigarette.

As shown in FIG. 2, the charging device also includes a housing 2 for fixing the charging base 10 and the USB joint 3, wherein a receiving space is formed for receiving the charging base 10 and for fixing the USB joint 3 in the housing 2. An opening (not labeled) is defined corresponding to the charging slot 1, and the USB joint 3 extends out from the housing 2 to connect with an external power source. In some other embodiments of the invention, the connecting way between the USB joint 3 and the housing 2 can be but shall not be limited to a sliding connection, the specific structure of which belongs to the prior art and thus details of which need not be given here. By using an USB joint, the charging device can enjoy a stronger applicability.

As shown in FIG. 2, a charging slot 1 is configured in the charging base 10, and the electronic cigarette can be clamped by the charging slot 1 after being inserted into the charging slot 1. The objective of the clamping on the electronic cigarette is to prevent the electronic cigarette from displacing to further cause poor charging contact due to assistance of resilience, during the charging process. Herein, both the first charging electrode assembly 11 and the second charging electrode assembly 13 are resilient electrode assemblies, and extend into the charging slot 1. The second charging electrode assembly 13 extends out from a bottom surface of the charging slot 1, while the first charging electrode assembly 11 extends out from a lateral surface of the charging slot 1. Thus after the electronic cigarette 1 shown in FIG. 1 is inserted into the charging slot 1, the second electrode 31 in the center of an end cover 4 and the first electrode 30 around the periphery of the end cover 4 can resiliently abut against the second charging electrode assembly 13 and the first charging electrode assembly 11 respectively. During charging process, the first charging electrode assembly 11 and the second charging electrode assembly 13 respectively provide resilience in a direction opposite to the inserting direction of the electronic cigarette. The resilience is provided for achieving the greatest mutual electrode contacting area when the electronic cigarette is clamped in the charging slot. Therefore, it can be guaranteed that the first electrode 30 and the second electrode 31 can be always electrically connected with the first charging electrode assembly 11 and the second charging electrode assembly 13, during the charging process.

In this embodiment, the first charging electrode assembly 11 includes a first charging electrode 24 and a first elasticpiece 14. One end of the first elasticpiece 14 abuts against the first charging electrode 24 and provides resilience for the first charging electrode 24 in the direction opposite to the inserting direction of the electronic cigarette, and the other end of the first elasticpiece 14 is fixed. The second charging electrode assembly 13 includes a second charging electrode 25 and a second elasticpiece 15. One end of the second elasticpiece 15 abuts against the second charging electrode 25 and provides resilience for the second charging electrode 15 in the direction opposite to the inserting direction of the electronic cigarette, and the other end of the second elasticpiece 15 is fixed.

Specifically, the first charging electrode assembly 11 is movably connected with the charging base 10 and sheathes the outer periphery of the charging base 10. Referring to FIG. 2, an abutment slope 42, sloping towards an inner surface of the charging base 10, is configured on an end surface of the first charging electrode assembly 11. The end surface extends into the charging slot 1 and contacts with the electronic cigarette. Because the abutment slope 42 enlarges the contacting area between the first charging electrode assembly 11 and the electronic cigarette, the charging device can be used for different diameter electronic cigarettes and same diameter electronic cigarettes with different size electrodes Therefore, the charging device of the electronic cigarette has a wider range of application and a better contact effect. In some other embodiment, the end surface of the first charging electrode assembly 11, for electrically connected to the electronic cigarette can also be a smooth curved surface.

To avoid the electronic cigarette from popping out from the charging slot 1 under the resilience provided by the first charging electrode assembly 11 and the second charging electrode assembly 13 in the direction opposite to the inserting direction of the electronic cigarette, at least one resilient resisting piece 20 protrudes from the inner surface of the charging base 10. In this case, the resilient resisting piece 20 is embedded in the lateral surface of the charging base 10. In some other embodiments according to present invention, the resilient resisting piece 20 can also be integrally formed with the charging base 10. The number of the resilient resisting piece can be one or more. The resilient resisting piece 20 can also be a convex rib (not labeled), which can be circularly fixed in the inner surface of the charging base 10.

Referring to FIG. 3, an exploded view of the charging device of the electronic cigarette in the embodiment is provided. In this case, the housing 2 includes an upper cover 33 and a base cover 35, which are mutually engaged with each other. A limiting panel (not labeled) protrudes in lateral surfaces of the upper cover 33 and a base cover 35 to limits positions of the charging base 10 and the USB joint 3. In this case, the charging device of the electronic cigarette includes a charging control panel 16 which directly electrically connects to the first charging electrode assembly 11 and the second charging electrode assembly 13 respectively. The charging control panel 16 is directly connected with the charging base 10 in a snap-fit connection. Thus, the charging control panel 16 of the present embodiment may be used to fix the first elasticpiece 14 and the second elastic piece 15 at the same time, as well as being used to electrically connect with the first charging electrode assembly 11 and the second charging electrode assembly 13 respectively. In this embodiment, the first elasticpiece 14 and the second elastic piece 15 are both spring. Refer to the cutaway view of the assembled charging device of the electronic cigarette, it can be seen that the first elasticpiece 14 sheaths the outer surface of the charging base 10 and is arranged outside a receiving cavity 37. One end of the first elastic piece 14 abuts against the first charging electrode 24, while the other end of the first elastic piece 14 abuts against the charging control panel 16. One end of the second elastic piece 15 abuts against the second charging electrode 25, while the other end of the second elastic piece 15 abuts against the charging control panel 16.

Referring the FIG. 3, the number of the resilient resisting pieces 20 is two, and conceivably it can be more than two.

Corresponding to the lateral surface of the charging base 10, two or more resilient resisting pieces 20 are embedded in the lateral surface of the charging base 10 and further protruded in the charging base 10 in an axial symmetry way. A first through hole 12 is defined in the lateral surface of the charging base 10, corresponding to the position of the resilient resisting pieces 20, and the resilient resisting pieces 20 can be embedded into the first through hole 12 and further partially extends into the charging slot 1. With the plurality of resilient resisting pieces 20 and a symmetrically even distribution of the resilient resisting pieces 20, it is possible to guarantee a sufficiently clamping effect on the electronic cigarette when the electronic cigarette is inserted, instead of the displacement of the electronic cigarette caused by the upward resilience of the charging electrode. Therefore, the electrodes of the electronic cigarette can have a sufficient contact with the charging device, and further to achieve the goal of a stable charging.

Figure 4:
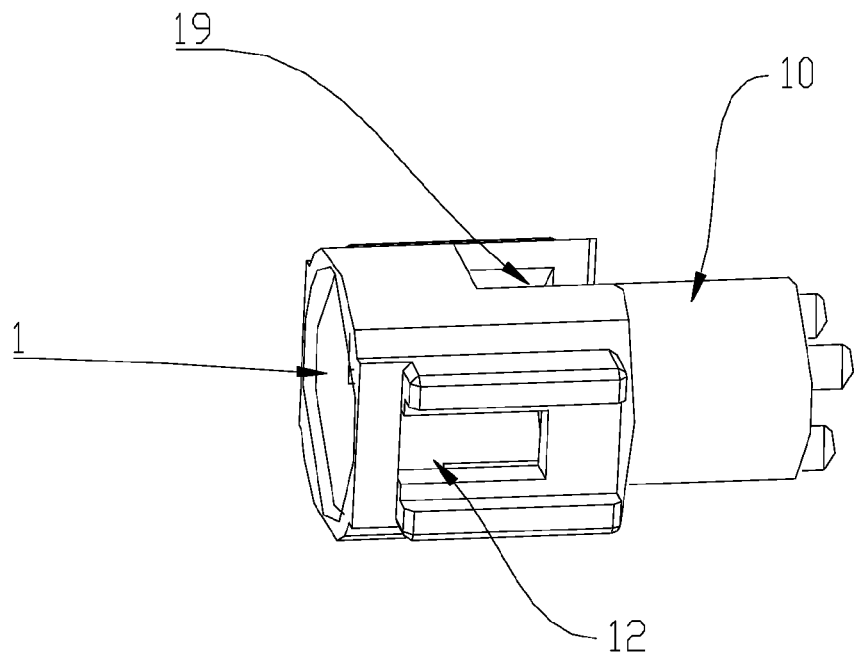
FIG. 4 illustrates a stereoscopic view of a charging base of the charging device of the electronic cigarette shown in FIG. 2.
Figure 5:
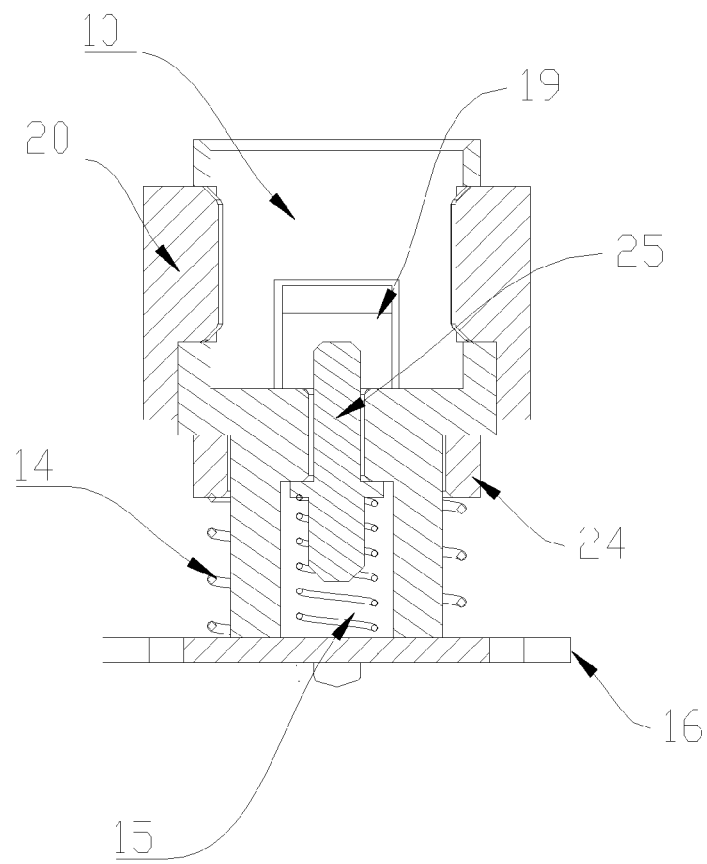
FIG. 5 illustrates a cutaway view of the matching way among a first charging electrode assembly, a second charging electrode assembly and a charging control panel in the charging device of the electronic cigarette shown in FIG. 2.

As shown in FIG. 3, the receiving cavity 37 is defined at an end of the charging base 10, and the receiving cavity 37 is configured along the axial direction of the charging base 10. Combining FIG. 2 and FIG. 5, it can be seen that the second charging electrode 25 is arranged in the receiving cavity 37 in a stretchable way and further extends axially into the charging slot 1 from the bottom surface of the charging slot 1. The first charging electrode 24 partially sleeves around the receiving cavity 37 and partially extends into the charging slot 1. Both of the first charging electrode 24 and the second charging electrode 25 partially extend into the charging slot 1, to ensure the electrodes of the electronic cigarette to have a sufficient resisting under the resilience. Arranging holes 19 are also axially defined in a lateral surface of the charging slot 1, for the first charging electrode 24 to extend in. The arranging holes 19 communicate with the charging slot 1 and smoothly join the outer surface of the receiving cavity 37. The first elastic piece 14 sleeves outside the receiving cavity 37 and abuts against the charging control panel 16, while the second elastic piece 15 is received inside the receiving cavity 37 and abuts against the charging control panel 16. Besides, as shown in FIG. 4, protrusions 38 are arranged on the contact surface of the receiving cavity 37 which contacts the charging control panel 16. It can also be seen from FIG. 3 that fixing holes are arranged on the charging panel 16 corresponding to the protrusions 38. Therefore, the fixing between the charging control panel 16 and the charging base 10 is realized by the fitting between the protrusions 38 and fixing holes 39. For the fitting between the protrusions 38 and fixing holes 39, the charging control panel 16 is firmly fixed and positioned on one side of the charging base 10, and the resilient electrodes can tightly abut against the charging control panel 16 to further form an electrical connection.

In this embodiment, the charging device of the electronic cigarette is provided with the charging control panel 16 and a main control panel 17 which are electrically connected with each other. The main control panel 17 is firmly fixed with the USB joint 3, a control circuit is configured on the main control panel 17 for adjusting a supply voltage of an external power source input by the USB joint 3, and the main control panel 17 is also helpful to the fixing of the USB 3 in the housing 2. It is conceivable that, in some other embodiments, the control circuit can be separately provided on the charging control panel 16 and the main control panel 17, or only be provided on the charging control panel 16 to optimize the layout of the circuit. To facilitate users' observation on the charging states, in the charging device of the electronic cigarette of the present invention, an indicator (not shown) is also inserted on the main control panel 17 for indicating the charging states of the electronic cigarette. After the insertion of the electronic cigarette into the charging slot 1, as long as it is in the charging state, the indicator will turn on. In order to transmit the light emitted by the indicator to the outside of the housing 2, the housing 2 in this embodiment is defined with a second through hole 36 at the region corresponding to the indicator, and a light guiding column 18 is embedded in the second through hole 36. When the indicator is on, the light can be transmitted by the light guiding column 18 to the outside of the housing 2, thus facilitating users to judge whether the electronic cigarette is in the charging state or not.

Figure 6:
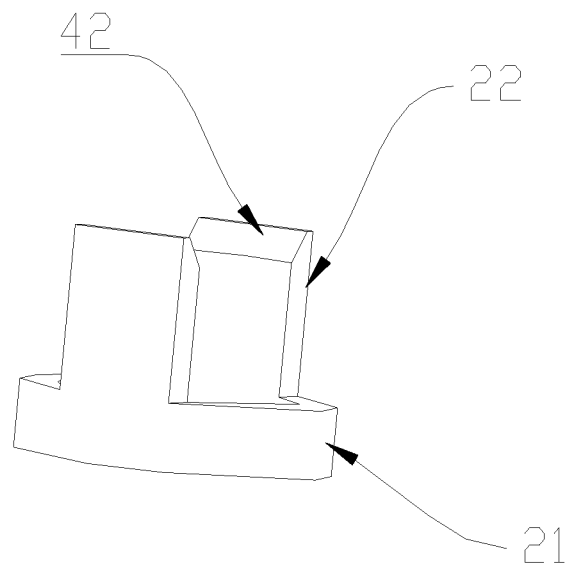
FIG. 6 illustrates a stereoscopic view of the first charging electrode assembly of the charging device of the electronic cigarette shown in FIG. 2.

As shown in FIG. 6, in this embodiment, the first charging electrode 24 includes an annular sleeve part 21 and at least one gripping part 22 which at least partially perpendicularly extends along a side of the annular sleeve part 21. The number of the gripping part 22 in this embodiment is two, and conceivably can be three, four or more. A plurality of the gripping parts 22 are evenly and symmetrically distributed at an end of the annular sleeve part 21 around the central axis of the annular sleeve part 21. The annular sleeve part 21 sleeves around the receiving cavity 37 of charging base 10 shown in FIG. 3, and the plurality of gripping parts 22 which distributed at the end of the annular sleeve part 21 all extends into the charging slot 1 along the arranging holes 19. The advantage of the plurality of gripping part 22 is also to achieve a better and sufficient contact with one corresponding electrode of the electronic cigarette. For the arranging hole 19 in FIG. 3 smoothly joins the outer surface of the receiving cavity 37, the first charging electrode 24 can stretch out or draw back in the axial direction of the charging slot 1, under the resilience of the first elastic piece 14 or an external force.

Figure 7:
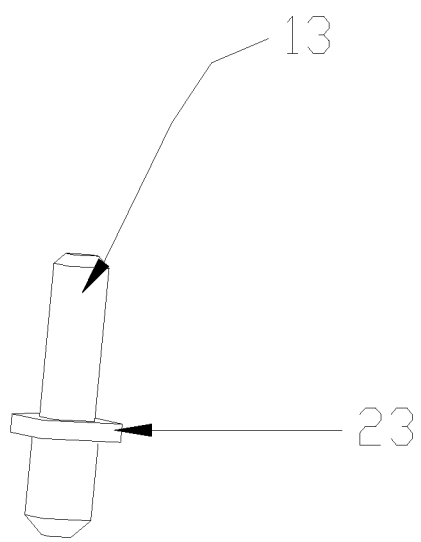
FIG. 7 illustrates a stereoscopic view of the second charging electrode assembly of the charging device of the electronic cigarette shown in FIG. 2.

As shown in FIG. 7, the second charging electrode 25 of the present embodiment is a conductive column, which runs out from the bottom of the charging slot 1. An annular limiting part 23 protrudes from an outer surface of the conductive column. With the combination of FIG. 3, it can be seen that a second elastic piece 15 sleeves is provided between the annular limiting part 23 and the charging control panel 16. Wherein one end of the second elastic piece 15 abuts against the annular limiting part 23 and the other end of the second elastic piece 15 abuts against the charging control panel 16. The annular limiting part 23 is configured for limiting the position of the second charging electrode 25 in the receiving cavity 37 to prevent the second charging electrode 25 to run out of the receiving cavity 37 under the resilience in the direction opposite to the inserting direction of the electronic cigarette, caused by the second elastic piece 15. Thus, it further assures the stable conductive connection between the second charging electrode 25 and the electronic cigarette.

Figure 8:
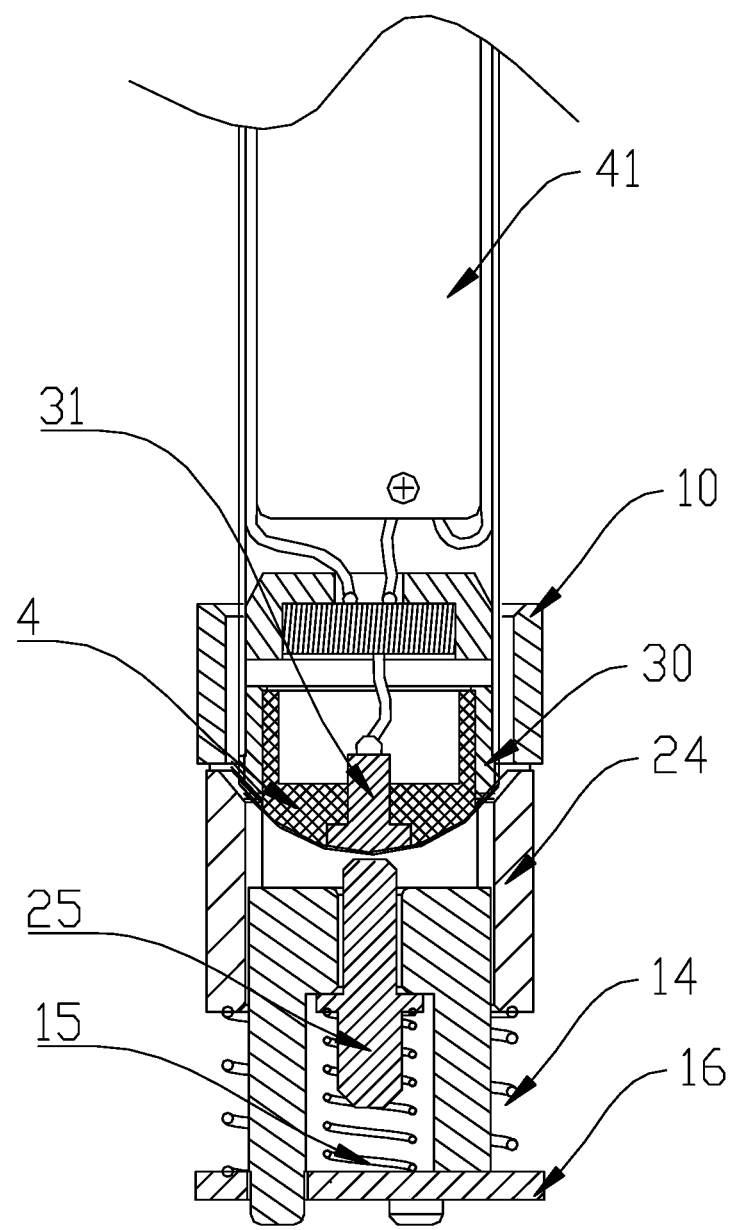
FIG. 8 illustrates a structure of the connection between a charging device of an electronic cigarette in accordance with an embodiment of the present invention and an electronic cigarette.

As shown in FIG. 8, with the aforementioned structure, after inserting of the electronic cigarette into the charging slot 1, the electronic cigarette moves away the charging slot 1 under resilience from the first charging electrode assembly 11 and the second charging electrode assembly 13. When a friction resilient provided to the electronic cigarette by the resilient resisting pieces 20 protruded from and embedded in the inner surface of the charging slot 1 equals to the resilience from the first charging electrode assembly 11 and the second charging electrode assembly 13, a stable electrical connection is then realized. Finally, the first electrode 30 abuts against the first charging electrode 24 and the second electrode 31 abuts against the second charging electrode 25. With the adoption of the charging device of the electronic cigarette which is provided with a first charging electrode assembly 11 and a second charging electrode assembly 13 which coaxially sheathe with each and both partially extend into the charging slot, the two coaxially sheathing electrodes can provide upward resilience at the downward movement of the electronic cigarette. The upward resilience is possible to achieve a more sufficient and stable contact between electrodes. Therefore, compared with the lateral and central charging way in prior art, the coaxially sheathing configuration is more reliable, and it can achieve a simplified and compact structure. Furthermore, the electronic cigarette with two coaxially sheathing electrodes can be comparatively inserted into the charging device of the electronic cigarette and be firmly fixed, so that the charging operation is stable. Besides, the charging device of the electronic cigarette can efficiently avoid the defects of charging failure caused by the improper screwing of charging device with threaded connections. At the same time, it also decreases the risk of damaging the electronic cigarette because of over screwing. In addition, the charging device of the electronic cigarette has a wide scope of application, and can be suitable for charging electronic cigarettes with different diameters, including the electronic cigarette shown in FIG. 1.

The present invention also discloses a charging method of a charging device of an electronic cigarette, which includes steps as follows.

In an inserting step, by applying an external force, the electronic cigarette is inserted into a charging slot 1 of a charging base 10 and the electronic cigarette resiliently abuts against the first charging electrode assembly 11 and the second charging electrode assembly 13, which coaxially sheathe each other and extend into the charging slot 1.

In a charging step, by releasing the external force, the electronic cigarette moves towards an opening of the charging slot 1 under resilience of the first charging electrode assembly 11 and the second charging electrode assembly 13 until a friction resilient provided to the electronic cigarette by resilient resisting pieces.

The charging device of electronic cigarette used in the aforementioned charging method has the same technical features with the charging device of electronic cigarette provided in the invention, and thus details of which need not be given here.

While the present invention has been described with reference to preferred embodiments, it will be understood by those skilled in the art that various changes may be made and equivalents may be substituted without departing from the scope of the present invention. However, all the changes and equivalents will be included within the scope of the appended claims.

The invention claimed is:

1. A charging device of an electronic cigarette, including a charging base (10), in which a first charging electrode assembly (11) and a second charging electrode assembly (13) are arranged separately for electrically connecting with a first electrode and a second electrode of the electronic cigarette characterized in that, a charging slot (1) is defined in the charging base (10), the charging slot (1) is configured for the electronic cigarette to be inserted in; and wherein the first charging electrode assembly (11), the second charging electrode assembly (13) and the charging base (10) are coaxially sheathed, and both the first charging electrode assembly (11) and the second charging electrode assembly (13) extend into the charging slot (1); and wherein the first charging electrode assembly (11) includes a first charging electrode (24) and a first elastic piece (14) abutting against the first charging electrode (24) and providing resilience in a direction opposite to an inserting direction of the electronic cigarette to the first charging electrode (24); the second charging electrode assembly (13) includes a second charging electrode (25) and a second elastic piece (15) abutting against the second charging electrode (25) and providing resilience in the direction opposite to the inserting direction of the electronic cigarette to the second charging electrode (25).

2. The charging device of the electronic cigarette of claim 1, characterized in that both the first charging electrode assembly (11) and the second charging electrode assembly (13) are resilient electrode assembly; wherein the first charging electrode assembly (11) and second charging electrode assembly (13) resiliently abut against the first electrode and the second electrode during charging process, and provide resilience in a direction opposite to an inserting direction of the electronic cigarette, respectively.

3. The charging device of the electronic cigarette of claim 1, characterized in that the first charging electrode assembly (11) is movably connected with the charging base (10) and sheathes outer periphery of the charging base (10).

4. The charging device of the electronic cigarette of claim 1, characterized in that an abutment slope (42) sloping towards an inner surface of the charging base (10), is configured on an end surface of the first charging electrode assembly (11), and the end surface electrically contacts with the electronic cigarette.

5. The charging device of the electronic cigarette of claim 1, characterized in that at least one resilient resisting piece (20) used for clamping the electronic cigarette is protruded from and embedded in an inner surface of the charging slot (1).

6. The charging device of the electronic cigarette of claim 5, characterized in that at least one first through hole (12) communicating with the charging slot (1) is defined on a lateral surface of the charging base (10), and the at least one resilient resisting piece (20) is embedded into the at least first through hole (12) and further partially extends into the charging slot (1).

7. The charging device of the electronic cigarette of claim 1, characterized in that arranging holes (19) communicating with the charging slot (1) are also defined on a lateral surface of the charging base (10), and the first charging electrode (24) partially runs through the arranging holes (19) and protrudes from a surface of the charging slot (1).

8. The charging device of the electronic cigarette of claim 7, characterized in that the first charging electrode (24) includes an annular sleeve part (21) which is sleeved in the charging base (10) and griping parts (22) which at least partially perpendicularly extend along sides of the annular sleeve part (21); the gripping parts (22) are embedded in the arranging holes (19) and protrude from an inner surface of the charging slot (1); the annular sleeve part (21) abuts against the first elastic piece (14); and the gripping parts (22) and the annular sleeve part (21) are retractable in an axial direction of the charging slot (1).

9. The charging device of the electronic cigarette of claim 8, characterized in that the first elastic piece (14) is a spring sheathing the charging base (10).

10. The charging device of the electronic cigarette of claim 8, characterized in that a receiving cavity (37) is defined at an end of the charging base (10); the receiving cavity (37) communicates with the charging slot (1); the second charging electrode (25) is retractably arranged in the receiving cavity (37) and further extends into the charging slot (1).

11. The charging device of the electronic cigarette of claim 10, characterized in that a charging control panel (16) is arranged at end of the receiving cavity (37) away from the charging base (10), for electrically connecting to the first charging electrode assembly (11) and the second charging electrode assembly (13) respectively; one end of the first elastic piece (14) abuts against the first charging electrode (24), while the other end of the first elastic piece (14) abuts against the charging control panel (16).

12. The charging device of the electronic cigarette of the claim 11, characterized in that the second charging electrode (25) is a conductive column, which runs out from a bottom of the charging slot (1), with an annular limiting part (23) protruding from an outer surface of the conductive column; a second elastic piece (15) sleeves between the annular limiting part (23) and the charging control panel (16), wherein one end of the second elastic piece (15) abuts against the annular limiting part (23), and the other end of the second elastic piece (15) abuts against the charging control panel (16).

13. The charging device of the electronic cigarette of claim 12, characterized in that the second elastic piece (15) is a spring.

14. The charging device of the electronic cigarette of claim 11, characterized in that the charging device of the electronic cigarette also includes a housing (2) for fixing the charging base (10), an USB joint (3) for connecting an external power source is configured on the housing (2), and the USB joint (3) is electrically connected to the charging control panel (16).

15. The charging device of the electronic cigarette of claim 14, characterized in that the housing (2) includes an upper cover (33) and a base cover (35) fitted to each other.

16. The charging device of the electronic cigarette of claim 14, characterized in that an indicator is arranged on the charging control panel (16), for indicating charging states, a second through hole (36) is defined at a position corresponding to the indicator on the housing (2), and a light guiding column (18) is embedded in the second through hole (36).

17. A charging method of a charging device of an electronic cigarette, characterized in that, the charging method comprises steps as follows:
   inserting step: by applying an external force, inserting the electronic cigarette into a charging slot (1) of a charging base (10), and the electronic cigarette resiliently abutting against a first charging electrode assembly (11) and a second charging electrode assembly (13), the first charging electrode assembly (11), the second charging electrode assembly (13) and the charging base (10) are coaxially sheathed;
   charging step: by releasing the external force, the electronic cigarette moving towards an opening of the charging slot (1) under resilience of the first charging electrode assembly (11) and the second charging electrode assembly (13) until a friction resilient provided to the electronic cigarette by at least one resilient resisting piece (20), and thus forming an electrical connection;
   wherein the first charging electrode assembly (11) includes a first charging electrode (24) and a first elastic piece (14) abutting against the first charging electrode (24) and providing resilience in a direction opposite to an inserting direction of the electronic cigarette to the first charging electrode (24); the second charging electrode assembly (13) includes a second charging electrode (25) and a second elastic piece (15), abutting against the second charging electrode (25) and providing resilience in the direction opposite to the inserting direction of the electronic cigarette to the second charging electrode (25).

18. The charging method of the charging device of the electronic cigarette of claim 17, characterized in that an abutment slope (42), sloping towards an inner surface of the charging base (10), is configured on an end surface of the first charging electrode assembly (11), and the end surface electrically contacting with the electronic cigarette.

* * * * *